US008258069B2

(12) United States Patent
Mizuno (10) Patent No.: US 8,258,069 B2
(45) Date of Patent: Sep. 4, 2012

(54) ZEOLITIC SEPARATION MEMBRANE AND PROCESS FOR PRODUCING THE SAME

(75) Inventor: Takehito Mizuno, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 75 days.

(21) Appl. No.: 12/063,832

(22) PCT Filed: Aug. 17, 2006

(86) PCT No.: PCT/JP2006/316174
§ 371 (c)(1),
(2), (4) Date: May 4, 2009

(87) PCT Pub. No.: WO2007/029464
PCT Pub. Date: Mar. 15, 2007

(65) Prior Publication Data
US 2009/0220414 A1   Sep. 3, 2009

(30) Foreign Application Priority Data

Sep. 1, 2005 (JP) ................................. 2005-253946

(51) Int. Cl.
*B01J 20/28* (2006.01)
*B01J 29/06* (2006.01)
*C01B 39/02* (2006.01)
(52) U.S. Cl. ............................. 502/4; 502/60; 423/709
(58) Field of Classification Search ................ 502/4, 60; 423/709
See application file for complete search history.

(56) References Cited

U.S. PATENT DOCUMENTS

| 3,662,563 | A | 5/1972 | Sudmeier |
| 5,554,286 | A | 9/1996 | Okamoto et al. |
| 6,620,320 | B1 | 9/2003 | Hying et al. |
| 6,767,384 | B1 | 7/2004 | Vu et al. |
| 7,798,334 | B2 | 9/2010 | Mizuno et al. |
| 2001/0056215 | A1* | 12/2001 | Verduijn et al. ............... 585/418 |
| 2003/0044350 | A1 | 3/2003 | Lam et al. |
| 2005/0067344 | A1 | 3/2005 | Tanaka et al. |
| 2006/0011535 | A1 | 1/2006 | Ikeda et al. |
| 2007/0265484 | A1* | 11/2007 | Li et al. ........................... 585/818 |
| 2009/0130000 | A1 | 5/2009 | Inoue |
| 2009/0220414 | A1 | 9/2009 | Mizuno |
| 2010/0233364 | A1 | 9/2010 | Mizuno et al. |

FOREIGN PATENT DOCUMENTS

| EP | 0 976 440 A1 | 2/2000 |
| JP | 63-291809 A | 11/1988 |
| JP | 7-109116 A | 4/1995 |
| JP | 8-257301 A | 10/1996 |
| JP | 8-257302 A | 10/1996 |
| JP | 8-318141 A | 12/1996 |
| JP | 10-36113 A | 2/1998 |
| JP | 10-114516 A | 5/1998 |
| JP | 10-212117 A | 8/1998 |
| JP | 2000-42387 A | 2/2000 |
| JP | 2001-097715 A | 4/2001 |
| JP | 2002-018247 A | 1/2002 |
| JP | 2002-058972 A | 2/2002 |
| JP | 2003-326142 A | 11/2003 |
| JP | 2004-082008 A | 3/2004 |
| JP | 2004-123415 A | 4/2004 |
| JP | 2005-125313 A | 5/2005 |
| JP | 2006-008510 A | 1/2006 |
| JP | 2006-159031 A | 6/2006 |
| WO | 96/01683 A1 | 1/1996 |
| WO | 02/38258 A1 | 5/2002 |
| WO | 2005-014481 A1 | 2/2005 |
| WO | 2006/059394 A1 | 6/2006 |

OTHER PUBLICATIONS

Li, et al., "SAPO-34 membranes for CO2/CH4 separation", Journal of Membrane Science, 241 (2004), pp. 121-135.*
Burriesci, N., et al., "Influence of Temperature on Hydrothermal Synthesis of Zeolites from Lipari Pumice", Materials Chemistry and Physics, Apr. 1983, pp. 305-314, vol. 8, No. 4, Elsevier Sequoia, Netherlands, XP022846979.
International Preliminary Report on Patentability.
Extended European Search Report on Application No. 07 71 4860 dated Apr. 26, 2010.
European Search Report for Application No. 06781804.7.
Japanese Office Action dated Aug. 23, 2011 issued in Japanese Patent Application No. P2006-048829.

* cited by examiner

*Primary Examiner* — Elizabeth Wood
(74) *Attorney, Agent, or Firm* — Sughrue Mion, PLLC (57) ABSTRACT

The invention provides a process for production of a zeolite separation membrane having a porous support and a zeolite layer formed on the porous support, the process comprising: a seed crystal attaching step in which zeolite seed crystals are attached to the porous support; a layer forming step in which: the porous support to which the zeolite seed crystals have been attached is contacted with a reaction solution containing zeolite raw material, and the temperature of the reaction solution is raised to a prescribed temperature to form a zeolite layer on the porous support; and a support separating step in which the porous support on which the zeolite layer has been formed is separated from the reaction solution; wherein in the layer forming step, after the start of contact between the porous support and reaction solution, the temperature of the reaction solution is held at or below 40° C. for at least 30 minutes before being raised to the prescribed temperature. The production process of the invention yields a zeolite separation membrane that can accomplish reliable and satisfactory separation of alcohol and water even when the water content relative to alcohol is low.

5 Claims, 6 Drawing Sheets

Fig.6

ZEOLITIC SEPARATION MEMBRANE AND PROCESS FOR PRODUCING THE SAME

TECHNICAL FIELD

The present invention relates to a zeolite separation membrane and to a process for its production.

BACKGROUND ART

A zeolite separation membrane comprising a porous support and a zeolite layer formed on the porous support is widely used as a means of separation of organic solvent (particularly alcohol) and water.

A known conventional process for production of a zeolite separation membrane with relatively high separation performance is a process in which: a reaction solution containing zeolite raw material is aged at room temperature for a prescribed time; then a porous support having zeolite seed crystals attached thereto is immersed in the reaction solution; and the hydrothermal reaction is performed at a temperature of 80° C. or higher (see Patent documents 1 and 2, for example).

Patent document 1: Japanese Patent Application Laid-Open No. 8-257301

Patent document 2: Japanese Patent Application Laid-Open No. 2000-42387

DISCLOSURE OF THE INVENTION

Problem to be Solved by the Invention

Zeolite separation membranes obtained by the processes described in Patent documents 1 and 2, however, usually have separation factors of less than 2000 when the water content relative to alcohol is low (for example, alcohol/water (weight ratio)=99/1); and they have not always been capable of satisfactorily separating alcohol and water.

It is therefore an object of the present invention to provide a zeolite separation membrane that can accomplish reliable and satisfactory separation of alcohol and water even when the water content relative to alcohol is low, as well as a process for its production.

Means for Solving the Problem

In order to achieve the object stated above, the invention provides a process for production of a zeolite separation membrane having a porous support and a zeolite layer formed on the porous support, the process comprising:

a seed crystal attaching step in which zeolite seed crystals are attached to the porous support;

a layer forming step in which: the porous support to which the zeolite seed crystals have been attached is contacted with a reaction solution containing zeolite raw material, and the temperature of the reaction solution is raised to a prescribed temperature to form a zeolite layer on the porous support; and a support separating step in which the porous support on which the zeolite layer has been formed is separated from the reaction solution;

wherein in the layer forming step, after the start of contact between the porous support and reaction solution, the temperature of the reaction solution is held at or below 40° C. for at least 30 minutes before being raised to the prescribed temperature.

Here, the "reaction solution" may optionally be a gel. The "temperature of the reaction solution" is the temperature directly measured by contacting the reaction solution with a thermocouple. The "prescribed temperature" is a temperature higher than 40° C., and may be appropriately set depending on the type of zeolite to be formed, and on the composition and properties of the reaction solution.

A generally used process for production of a zeolite separation membrane is one wherein: a porous support having zeolite seed crystals attached thereto is immersed in a reaction solution containing zeolite raw material, and the hydrothermal reaction is performed. In this process, when the porous support is immersed in the reaction solution, the zeolite seed crystals attached to the porous support dissolve to form a supersaturated region around them, thus creating nuclei. The zeolite crystals grow by hydrothermal reaction around the seed crystals and the produced nuclei surrounding them, thereby forming a zeolite layer on the porous support.

In the hydrothermal reaction, the temperature of the reaction solution is generally raised to a prescribed temperature (usually 80° C. to 150° C.) in a relatively short period of time after the reaction begins, thus producing numerous nuclei and promoting growth of numerous microcrystals around the nuclei. This tendency is particularly notable when producing type A zeolite. The growth of numerous microcrystals results in formation of an inhomogeneous zeolite layer containing numerous microcrystals and grain boundaries (gaps), causing the separation performance of the resulting zeolite separation membrane to be low.

In the zeolite separation membrane production process of the invention, however, during formation of a zeolite layer on a porous support, the temperature of the reaction solution is held at or below 40° C. for at least 30 minutes before being raised to a prescribed temperature.

If the temperature of the reaction solution is held at or below 40° C. for at least 30 minutes before being raised to a prescribed temperature, zeolite crystals grow at a slow speed mainly around the seed crystals for at least 30 minutes after start of the reaction, with generation of nuclei suppressed, because the energy required for generation of nuclei is greater than the energy required for crystal growth. When the temperature of the reaction solution is subsequently raised to the prescribed temperature, the growing zeolite crystals further grow rapidly, thus forming a zeolite layer. Consequently, the production process mentioned above yields a zeolite separation membrane which has a homogeneous zeolite layer with very few microcrystals and grain boundaries, and which exhibits extremely high separation performance.

As mentioned above, a method wherein the reaction is initiated after allowing the reaction solution to stand at room temperature for a prescribed period of time is known in the prior art (see Patent document 1, for example). However, the present inventors have been the first to discover that the separation performance of a zeolite separation membrane can be increased by holding the temperature of the reaction solution at or below 40° C. for a prescribed period of time after start of the reaction as in the zeolite separation membrane production process of the invention.

In the layer forming step, after the start of contact between the porous support and reaction solution, the temperature of the reaction solution is preferably held between 25° C. and 35° C. for at least 30 minutes during the period in which the temperature is held at or below 40° C. If the temperature of the reaction solution is held between 25° C. and 35° C. for at least 30 minutes, generation of nuclei will be suppressed, and the separation performance of the resultant zeolite separation membrane will be high, compared to the case where the temperature is not held in the manner specified above.

Also in the layer forming step, the temperature of the reaction solution is preferably in the range between 0° C. and 30° C. at the start of contact between the porous support and reaction solution. In the reaction solution, nuclei will be generated and microcrystals will grow around the nuclei, even when no seed crystals are present, i.e. even before the start of contact with the porous support. If the temperature of the reaction solution is in the range between 0° C. and 30° C. at the start of contact, generation of nuclei and growth of microcrystals in the reaction solution before the start of contact will be suppressed, attachment of microcrystals to the porous support after the start of contact will be reduced, and the separation performance of the resultant zeolite separation membrane will be high, compared to the case where the temperature is outside of the range between 0° C. and 30° C.

Also in the layer forming step, the temperature of the reaction solution is preferably held at the prescribed temperature for at least 2 hours after being raised to the prescribed temperature. If the length of time for which the reaction solution is held at the prescribed temperature is less than 2 hours, the grain boundaries of the formed zeolite layer will tend to be large compared to the case where it is at least 2 hours.

The invention also provides a zeolite separation membrane obtainable by the zeolite separation membrane production process described above.

This type of zeolite separation membrane is a separation membrane which has a homogeneous zeolite layer with very few microcrystals and grain boundaries, and which exhibits extremely high separation performance; and it is capable of reliably and satisfactorily separating alcohol and water even when the water content relative to alcohol is low (for example, alcohol/water (weight ratio)=99/1).

Effects Of The Invention

The invention provides a zeolite separation membrane that can accomplish reliable and satisfactory separation of alcohol and water even when the water content relative to alcohol is low, as well as a process for its production.

EXPLANATION OF REFERENCE NUMERALS

10: Zeolite separation membrane; 1: porous support; 2: zeolite layer; 3: zeolite seed crystal; 4: reaction solution; 5: container; 100: preparation test apparatus; M: zeolite separation membrane; 11: container; 12: conduit; 13: stirrer; 14: conduit; 15: liquid nitrogen trap; 16: vacuum pump; 17: vacuum gauge.

BEST MODES FOR CARRYING OUT THE INVENTION

Preferred embodiments of the invention will now be explained in detail, with reference to the accompanying drawings as necessary. Identical or equivalent components will be indicated by the same reference numeral in the drawings.

[Zeolite Separation Membrane Production Process]

The zeolite separation membrane production process of the invention is a process for production of a zeolite separation membrane having a porous support and a zeolite layer formed on the porous support, and it comprises: a seed crystal attaching step in which zeolite seed crystals are attached to the porous support; a layer forming step in which the porous support to which the zeolite seed crystals have been attached is contacted with a reaction solution containing zeolite raw material to form a zeolite layer on the porous support; and a support separating step in which the porous support on which the zeolite layer has been formed is separated from the reaction solution. Zeolite composing a zeolite layer to be formed (also referred to as "zeolite to be formed" in the present specification) may be of any type such as type A, T, MFI, FAU or MOR.

(Seed Crystal Attaching Step)

In the seed crystal attaching step, zeolite seed crystals are attached to the porous support. If zeolite seed crystals are attached to the porous support before the porous support is contacted with the reaction solution, growth of zeolite crystals primarily on the porous support becomes possible.

The material for the porous support may be a ceramic, organic polymer, metal or the like. As ceramics there may be mentioned mullite, alumina, silica, titania, zirconia and the like, and as metals there may be mentioned stainless steel, sintered nickel, mixtures of sintered nickel and iron, and the like. As the porous support material, a ceramic is preferred, and especially alumina is preferred, from the viewpoint of resistance to elution in liquid. Sintered zeolite may also be used as the porous support.

The mean pore size of the porous support is preferably 0.1 μm to 20 μm, and more preferably 0.1 μm to 5 μm. A mean pore size of less than 0.1 μm will prevent sufficient attachment of seed crystals in the pores of the porous support, and will tend to result in peeling of the zeolite layer formed on the porous support, compared to a mean pore size of 0.1 μm to 20 μm. On the other hand, a mean pore size of greater than 20 μm will tend to produce defects such as pinholes in the zeolite layer formed on the porous support, compared to a mean pore size of 0.1 μm to 20 μm. If the mean pore size is 0.1 μm to 5 μm, it will be possible to more reliably prevent peeling of the zeolite layer and generation of defects such as pinholes.

The porosity of the porous support is preferably 5% to 50%, and more preferably 30% to 50%. A porosity of less than 5% will tend to lower the gas permeation rate and to reduce the permeation flux, compared to a porosity of 5% to 50%. On the other hand, a porosity of greater than 50% will tend to reduce the self-supporting property (mechanical strength) of the porous support, compared to a porosity of 5% to 50%. If the porosity is 30% to 50%, it will be possible to obtain a zeolite separation membrane with sufficiently high permeation flux and mechanical strength.

The shape of the porous support may be tubular, cylindrical, hollow fibrous, plate-like, honeycomb-shaped, pelleted, or the like. The shape may be appropriately selected depending on the purpose for which the zeolite separation membrane is to be used. For example, when the zeolite separation membrane is to be used for separation of organic solvent and water, it is preferably tubular, cylindrical or hollow fibrous.

There are no particular restrictions on the size of the porous support, but if the shape is tubular, for example, a length of 2 cm to 200 cm, an inner diameter of 0.5 cm to 2 cm and a thickness of 0.5 mm to 4 mm is practical.

The mean particle size of the seed crystals is preferably 1 nm to 1 µm, and more preferably 1 nm to 0.4 µm. If the mean particle size of the seed crystals is smaller than 1 nm or greater than 1 µm, the layer of the seed crystals attached to the porous support will be thick, growth of zeolite crystals will be difficult to occur except in the vicinity of the surface of the layer, and peeling of the zeolite layer formed on the porous support will tend to occur, compared to the case where the mean particle size is 1 nm to 1 µm. If the mean particle size of the seed crystals is 1 nm to 0.4 µm, it will be possible to more reliably prevent peeling of the zeolite layer.

The zeolite seed crystals do not necessarily need to be of the same type as the zeolite to be formed, and a different type may be used so long as the crystal structure is similar thereto.

As methods for attaching zeolite seed crystals to the porous support, there may be mentioned: a method wherein the porous support is contacted with a slurry containing zeolite seed crystals; a method wherein zeolite seed crystals are rubbed directly onto the porous support; and the like.

As methods for contacting the porous support with a slurry containing zeolite seed crystals, there may be mentioned: impregnation (method wherein the porous support is impregnated with the slurry), dip coating (method wherein the slurry is dropped and spin-coated onto the porous support), spray coating (method wherein the slurry is sprayed onto the porous support), application, filtration, and the like. The length of time for which the porous support is kept contacted with the slurry is preferably 0.5 to 60 minutes, and more preferably 1 to 10 minutes. If the contact time is less than 0.5 minute, attachment of seed crystals will tend to be difficult to occur, compared to the case where the contact time is 0.5 to 60 minutes. On the other hand, if the contact time is more than 60 minutes, the layer of the seed crystals attached to the porous support will be thick, growth of zeolite crystals will be difficult to occur except in the vicinity of the surface of the layer, and peeling of the zeolite layer formed on the porous support will tend to occur, compared to the case where the contact time is 0.5 to 60 minutes. If the contact time is 1 to 10 minutes, it will be possible to achieve satisfactory attachment of seed crystals and to more reliably prevent peeling of the zeolite layer.

The slurry containing zeolite seed crystals may be prepared by placing the zeolite seed crystals in water, a water-containing lower alcohol or the like, and stirring the mixture. The seed crystals used for preparation of the slurry are preferably zeolite microcrystals with a mean particle size of 1 nm to 1 µm. Use of such microcrystals will enable a stable dispersion state to be maintained without settling of seed crystals in the slurry. The concentration of seed crystals in the slurry is preferably 0.01% to 20% by weight, and more preferably 0.1% to 10% by weight. If the concentration of seed crystals is less than 0.01% by weight, seed crystals will not be readily attached to the porous support, and defects such as pinholes will tend to be produced in the zeolite layer formed on the porous support, compared to the case where the concentration of seed crystals is 0.01% to 20% by weight. On the other hand, if the concentration of seed crystals is greater than 20% by weight, the layer of the seed crystals attached to the porous support will be thick, growth of zeolite crystals will be difficult to occur except in the vicinity of the surface of the layer, and peeling of the zeolite layer formed on the porous support will tend to occur, compared to the case where the concentration of seed crystals is 0.01% to 20% by weight. If the concentration of seed crystals is 0.1% to 10% by weight, it will be possible to more reliably prevent peeling of the zeolite layer and generation of defects such as pinholes. The slurry may also contain additives such as surfactants.

In the seed crystal attaching step, the porous support and the seed crystals attached thereto are preferably dried after the zeolite seed crystals have been attached to the porous support. Drying of the porous support and the seed crystals attached thereto can further reinforce the attachment of the seed crystals. The drying is preferably performed at a temperature of no higher than 70° C. Drying at a temperature above 70° C. will tend to promote evaporation of the solvent and aggregation of the seed crystals, causing the homogeneity of attachment of the seed crystals to be low, compared to drying at a temperature of 70° C. or below. The drying is preferably a combination of room temperature drying and heated drying from the viewpoint of shortening the heating time during drying.

(Layer Forming Step)

In the layer forming step, the porous support to which the zeolite seed crystals have been attached (also referred to as "seed crystal-attached porous support" in the present specification) is contacted with the reaction solution containing zeolite raw material to form a zeolite layer on the porous support.

Here, the "reaction solution" may optionally be a gel. The zeolite layer may be formed on either side of the porous support. If the porous support is tubular, for example, it may be formed on either the outside or the inside.

The zeolite raw material may be a mixture of alumina source and silica source, or a mixture containing alkali metal source or alkaline earth metal source in addition to alumina source and silica source. As alumina sources there may be mentioned aluminum salts such as aluminum hydroxide, sodium aluminate, aluminum sulfate, aluminum nitrate and aluminum chloride, as well as alumina powder, colloidal alumina and the like. As silica sources there may be mentioned alkali metal silicates such as sodium silicate, water glass and potassium silicate, as well as silica powder, silicic acid, colloidal silica, acid clay, kaolin, silicon alkoxides (aluminum isopropoxide, etc.) and the like. As alkali metal sources or alkaline earth metal sources there may be mentioned sodium chloride, potassium chloride, calcium chloride, magnesium chloride and the like. An alkali metal silicate may be used as both a silica source and an alkali metal source.

The molar ratio of silica source and alumina source (calculated as $SiO_2/Al_2O_3$) may be appropriately set depending on the composition of the zeolite to be formed, but in ordinary cases, it is preferably 1 or greater, and more preferably 2 or greater.

The total content of silica source and alumina source in the reaction solution is preferably 50% to 99.5% by weight, and more preferably 60% to 90% by weight, based on the total weight of the reaction solution. If the total content is less than 50% by weight, growth of the zeolite crystals will tend to be slow, compared to the case where the total content is 50% to 99.5% by weight. On the other hand, if the total content is more than 99.5% by weight, formation of a homogeneous zeolite layer will not occur readily, compared to the case where the total content is 50% to 99.5% by weight. If the total content is 60% to 90% by weight, it will be possible to form a homogeneous zeolite layer more quickly.

The reaction solution may further contain an additive such as a crystallization promoter. As crystallization promoters there may be mentioned tetrapropylammonium bromide, tetrabutylammonium bromide and the like.

Figure 1:
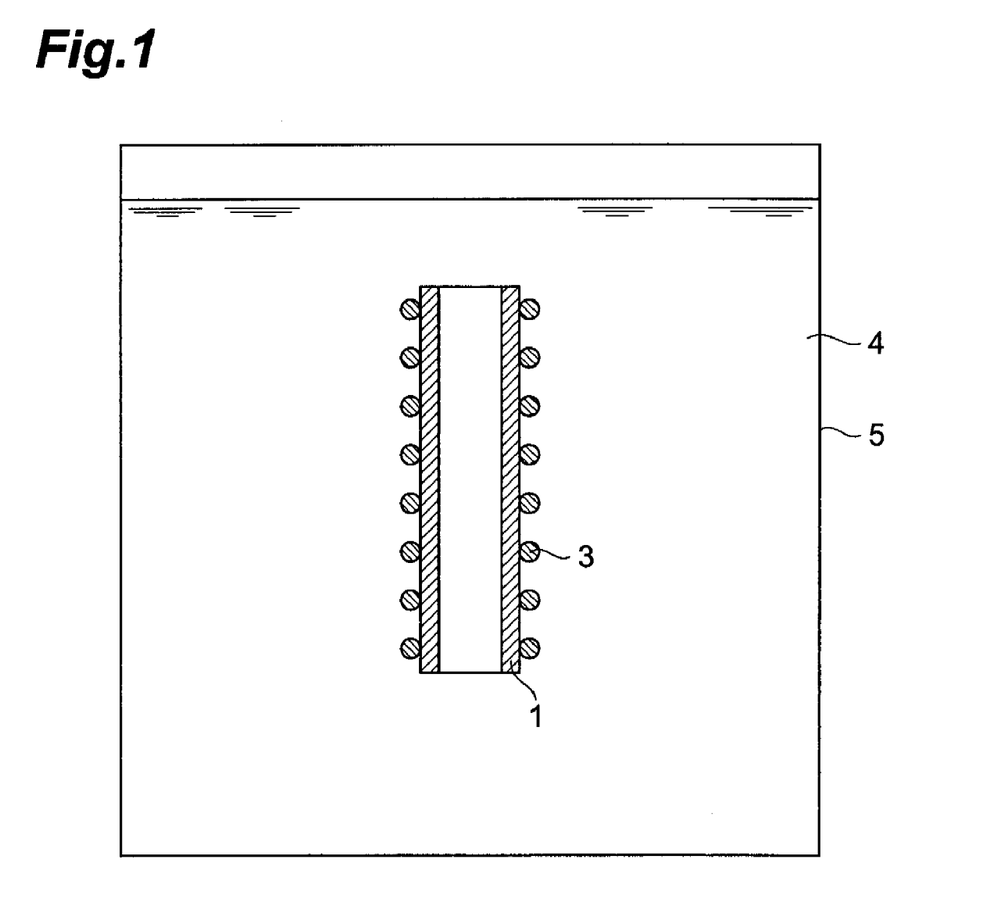
FIG. 1 is a schematic cross-sectional view showing a state of contact between the seed crystal-attached porous support and the reaction solution.

FIG. 1 is a schematic cross-sectional view showing a state of contact between the seed crystal-deposited porous support and the reaction solution. Contact between the seed crystal-attached porous support and the reaction solution can be accomplished by, for example, immersing the porous support 1 having the zeolite seed crystals 3 attached thereto in the reaction solution 4 housed in a container 5, as shown in FIG. 1. The porous support 1 shown in FIG. 1 is a tubular support. In FIG. 1, the zeolite seed crystals 3 are attached on the outside of the porous support 1; however, the zeolite seed crystals 3 may instead be attached on the inside of the porous support 1.

In the layer forming step, the temperature of the reaction solution is first held at or below 40° C. for at least 30 minutes, and then raised to a prescribed temperature. Here, the "temperature of the reaction solution" is the temperature directly measured by contacting the reaction solution with a thermocouple. The "prescribed temperature" is a temperature higher than 40° C., and may be appropriately set depending on the type of zeolite to be formed, and on the composition and properties of the reaction solution. By changing the temperature of the reaction solution in the manner described above, generation of nuclei in the supersaturated region is suppressed, and a zeolite layer with very few microcrystals and grain boundaries is formed, thus yielding a zeolite separation membrane with extremely high separation performance.

During the period in which the temperature of the reaction solution is held at or below 40° C., the temperature is preferably held between 25° C. and 35° C. for at least 30 minutes. If the temperature of the reaction solution is held between 25° C. and 35° C. for at least 30 minutes, generation of nuclei will be suppressed, and the separation performance of the resultant zeolite separation membrane will be high, compared to the case where the temperature is not held in the manner specified above. The length of time for which the reaction solution is held at or below 40° C. is preferably no longer than 60 minutes from the viewpoint of shortening the zeolite separation membrane production time.

The temperature of the reaction solution at the start of contact between the seed crystal-attached porous support and the reaction solution is preferably in the range between 0° C. and 30° C. If the temperature of the reaction solution is in the range between 0° C. and 30° C. at the start of contact, generation of nuclei in the reaction solution before the start of contact will be suppressed, attachment of microcrystals to the porous support after the start of contact will be reduced, and the separation performance of the resultant zeolite separation membrane will be high, compared to the case where the temperature is outside of the range between 0° C. and 30° C.

After raising the temperature of the reaction solution to the prescribed temperature, the reaction solution is preferably held at this temperature for at least 2 hours. If the length of time for which the reaction solution is held at the prescribed temperature is less than 2 hours, the grain boundaries of the formed zeolite layer will tend to be large compared to the case where it is at least 2 hours.

The prescribed temperature may be appropriately set depending on the type of zeolite to be formed, and on the composition and properties of the reaction solution. For example, when the zeolite to be formed is type A zeolite, the temperature may be 70° C. to 110° C.; when it is type FAU zeolite, the temperature may be 90° C. to 130° C.; and when it is type MOR zeolite, the temperature may be 150° C. to 190° C.

The temperature of the reaction solution may be adjusted by, for example, supplying a heating medium (for example, water or water vapor) to a jacket provided around a container which houses the reaction solution, or to a spiral tube provided inside a container which houses the reaction solution.

(Support Separating Step)

In the support separating step, the porous support on which the zeolite layer has been formed is separated from the reaction solution.

As methods for separating the porous support from the reaction solution, there may be mentioned: a method wherein the porous support is raised from the reaction solution; a method wherein only the reaction solution is removed through an outlet provided at the bottom section of the container; a method wherein the container housing the reaction solution is moved downward without moving the porous support; and the like.

(Support Washing Step)

The support separating step is preferably followed by a support washing step in which the porous support separated from the reaction solution is washed. In this step, unreacted substances, zeolite particles, amorphous components and the like which have been attached to the surface of the zeolite layer are removed. If the support washing step is performed, the separation performance of the resultant zeolite separation membrane will be higher.

As methods for washing the porous support, there may be mentioned: a method wherein the surface of the zeolite layer is brushed with the porous support contacted with water; a method wherein ultrasonic waves are applied to the surface of the zeolite layer with the porous support immersed in water; and the like.

Washing of the porous support is preferably performed within 30 minutes after the porous support has been separated from the reaction solution. If it is not performed within 30 minutes, the attached substances on the zeolite layer often become dried and hardened, and are therefore difficult to remove by washing, because the porous support is at high temperature immediately after being separated from the reaction solution.

(Support Cooling Step)

The support separating step is preferably followed by a support cooling step in which the porous support is cooled, either simultaneously with the support washing step or before the support washing step. If the support cooling step is performed, drying of the porous support will be more difficult to occur, and drying and hardening of the attached substances will be suppressed.

As methods for cooling the porous support, there may be mentioned: a method wherein the porous support is immersed in water of low temperature (for example, 10° C. to 40° C.); a method wherein the porous support is sprayed with water of low temperature (for example, 10° C. to 40° C.); and the like.

[Zeolite Separation Membrane]

Figure 2:
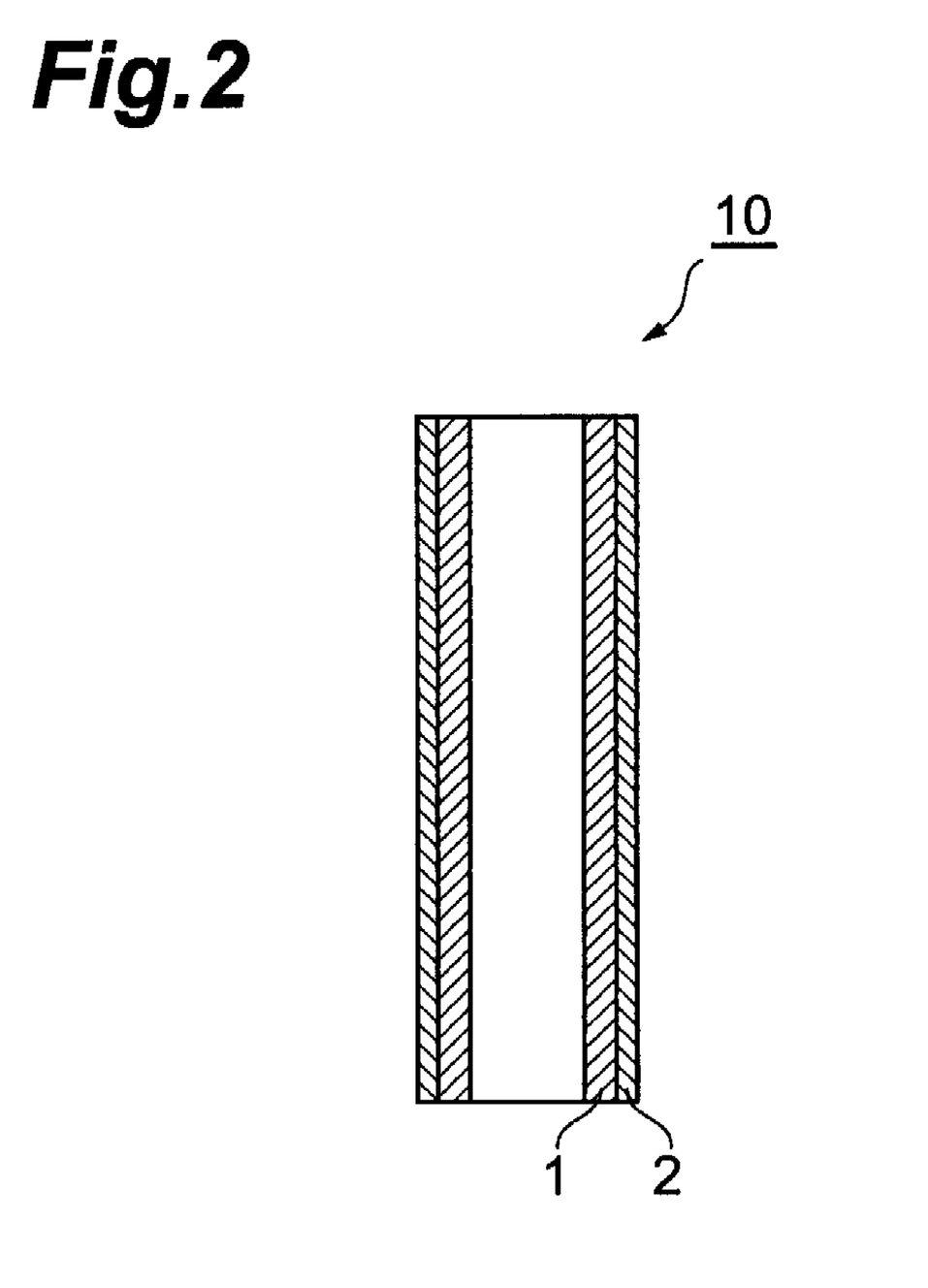
FIG. 2 is a schematic cross-sectional view showing an example of the zeolite separation membrane.

The zeolite separation membrane production process described above can yield a zeolite separation membrane shown in FIG. 2, for example. FIG. 2 is a schematic cross-sectional view showing an example of the zeolite separation membrane. The zeolite separation membrane 10 shown in FIG. 2 comprises a tubular porous support 1 and a zeolite layer 2 formed on the porous support 1. In FIG. 2, the zeolite layer 2 is formed on the outside of the porous support 1; however, the zeolite layer 2 may instead be formed on the inside of the porous support 1.

The separation performance of the zeolite separation membrane may be evaluated based on the separation factor. In the case of separation of ethanol and water, for example, the separation factor is the value expressed as $(B_1/B_2)/(A_1/A_2)$ where: the concentrations of water and ethanol in the mixture prior to separation are $A_1$% by weight and $A_2$% by weight, respectively, and the concentrations of water and ethanol in the liquid or gas permeating the zeolite separation membrane are $B_1$% by weight and $B_2$% by weight, respectively. A larger separation factor can be judged to mean that the separation performance is higher.

The practical utility of the resultant zeolite separation membrane may be evaluated based on the permeation flux. The permeation flux is the amount of liquid permeating the zeolite separation membrane per unit time, and a larger permeation flux can be judged to mean that the separation is faster and the practical utility is superior.

A zeolite separation membrane obtainable by the production process described above is a separation membrane having a homogeneous zeolite layer with very few microcrystals and grain boundaries, and it exhibits an extremely high separation factor as well as a satisfactorily high permeation flux. It can accomplish reliable and satisfactory separation of alcohol and water even when the water content relative to alcohol is low (for example, alcohol/water (weight ratio) 99/1).

EXAMPLES

The present invention will now be explained in greater detail based on examples and comparative examples. However, the present invention is not limited to the examples described below.

Example 1

Type A zeolite microcrystals (mean particle size: 100 nm to 1 μm) were placed in water and stirred to prepare a slurry with a concentration of 0.5% by weight. A tubular porous support made of α-alumina (mean pore size: 1.3 μm; outer diameter: 10 mm; inner diameter: 6 mm; length: 10 cm) was immersed for 3 minutes in the slurry, and then drawn out at a constant speed. After drying for 2 hours in a thermostatic bath at 25° C., it was further dried for 16 hours in a thermostatic bath at 70° C. By observing a cross-section of the dried porous support with a scanning electron microscope (SEM), it was confirmed that the zeolite seed crystals had been uniformly attached to the surface of the porous support.

Figure 3:
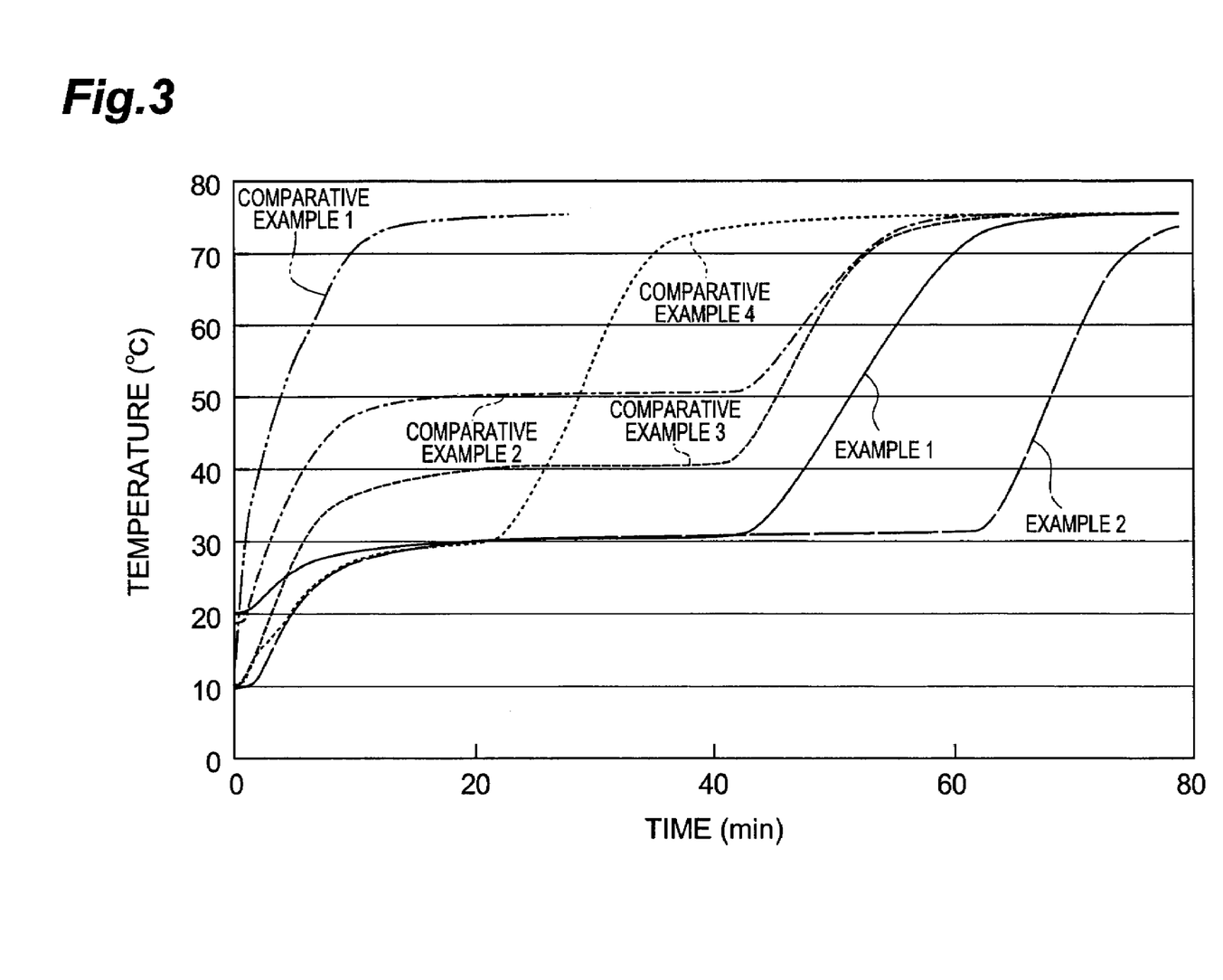
FIG. 3 is a graph showing the changes in temperature of the reaction solutions of Examples 1 and 2 and Comparative Examples 1 to 4 in relation to time.

Sodium silicate, aluminum hydroxide and distilled water were mixed to yield a reaction solution comprising 1 part by mole of alumina ($Al_2O_3$), 3.5 parts by mole of silicon dioxide ($SiO_2$), 8 parts by mole of sodium oxide ($Na_2O$) and 300 parts by mole of water. The prepared reaction solution was immediately transferred to a container surrounded by an outer jacket without aging, and the zeolite seed crystal-attached porous support was immersed in the reaction solution. The temperature of the reaction solution at the start of immersion (reaction) was adjusted to 20° C. After the start of immersion, the temperature of the reaction solution was first held at or below 32° C. for 40 minutes by circulation of 33° C. water for 40 minutes through the jacket; 76° C. water was then circulated through the jacket for 2 hours to raise the temperature of the reaction solution to 75° C.; and the temperature was subsequently held at 75° C. for 140 minutes. After the temperature was held at 75° C. for 140 minutes, the porous support was raised out of the reaction solution to separate it from the reaction solution, and then washed with water and dried at 36° C. for 16 hours. During the period in which the temperature of the reaction solution was kept at or below 32° C., the temperature was held between 25° C. and 32° C. for 30 minutes. The changes in temperature of the reaction solution during 80 minutes after the start of immersion are shown in FIG. 3. The "time" in FIG. 3 means time elapsed after the start of immersion.

Figure 4:
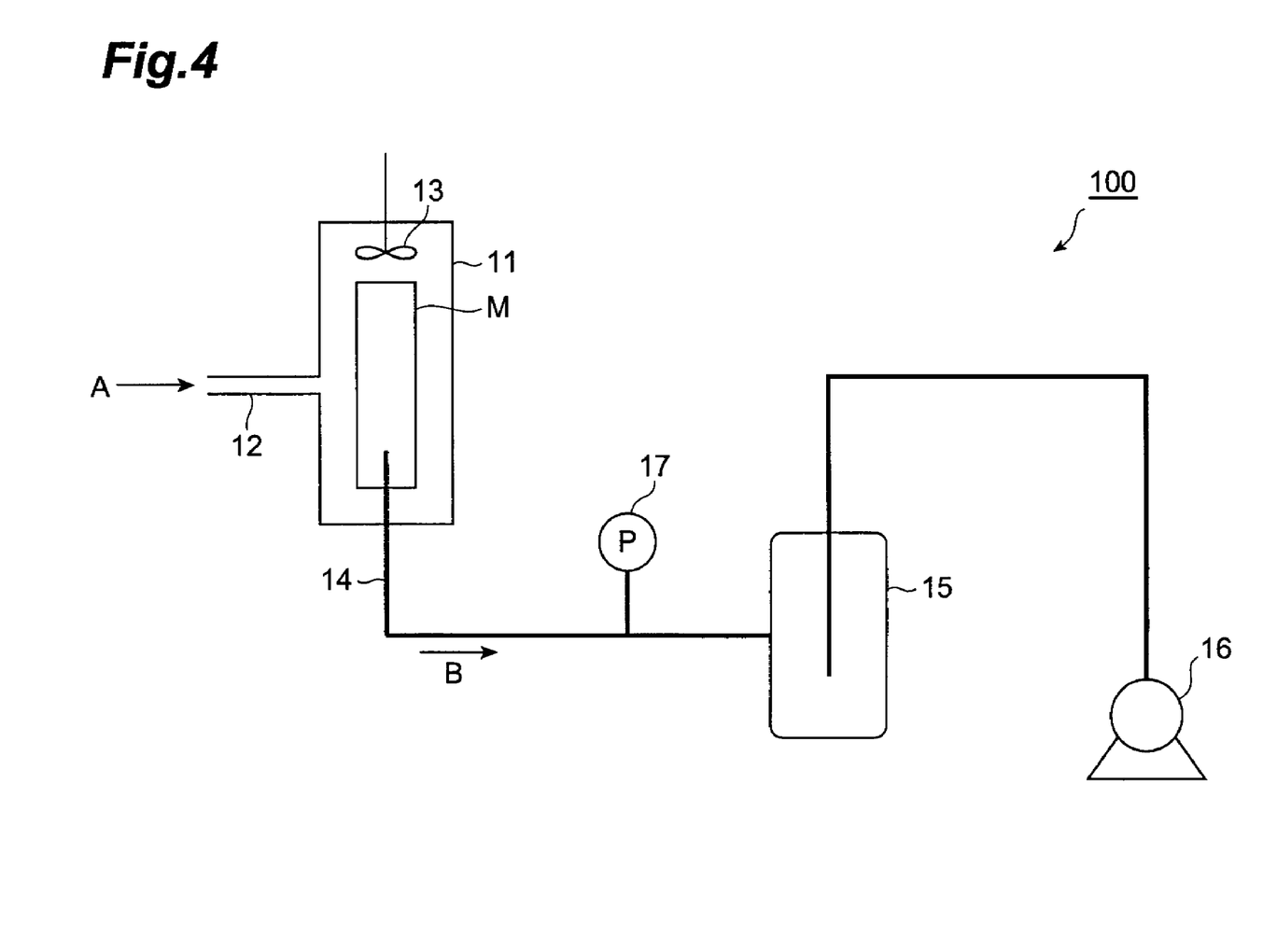
FIG. 4 is a schematic diagram of the pervaporation (PV) test apparatus used in Examples 1 and 2 and Comparative Examples 1 to 6.

A pervaporation (PV) test apparatus shown in FIG. 4 was assembled using the obtained zeolite separation membrane. The PV test apparatus 100 has a container 11 to which liquid A is supplied. A conduit 12 for supply of the liquid A to the container 11 is connected to the container 11; and a stirrer 13 for stirring of the liquid A and a zeolite separation membrane M are set in the container 11. One end of the tubular zeolite separation membrane M is sealed to prevent penetration of the liquid A, while a conduit 14 is connected to the other end (open end). A vacuum pump 16 is connected to the end of the conduit 14 via a liquid nitrogen trap 15. A vacuum gauge 17 is installed along the conduit 14.

The liquid A used was an isopropyl alcohol/water mixture at 75° C. with an isopropyl alcohol/water ratio (by weight) of 99/1. The liquid A was supplied through the conduit 12 to the container 11 of the PV test apparatus 100, and the interior of the zeolite separation membrane M was evacuated with the vacuum pump 16 to a degree of vacuum of 0.3 kPa as displayed by the vacuum gauge 17. Liquid B that permeated the zeolite separation membrane M was collected at the liquid nitrogen trap 15. The compositions of the liquid A and liquid B were measured using a gas chromatograph (GC-14B, product of Shimadzu Corp.), and the separation factor was determined. The weight of the collected liquid B was measured, and the permeation flux ($Kg/m^2$ h) was determined. The results are shown in Table 1.

Figure 5:
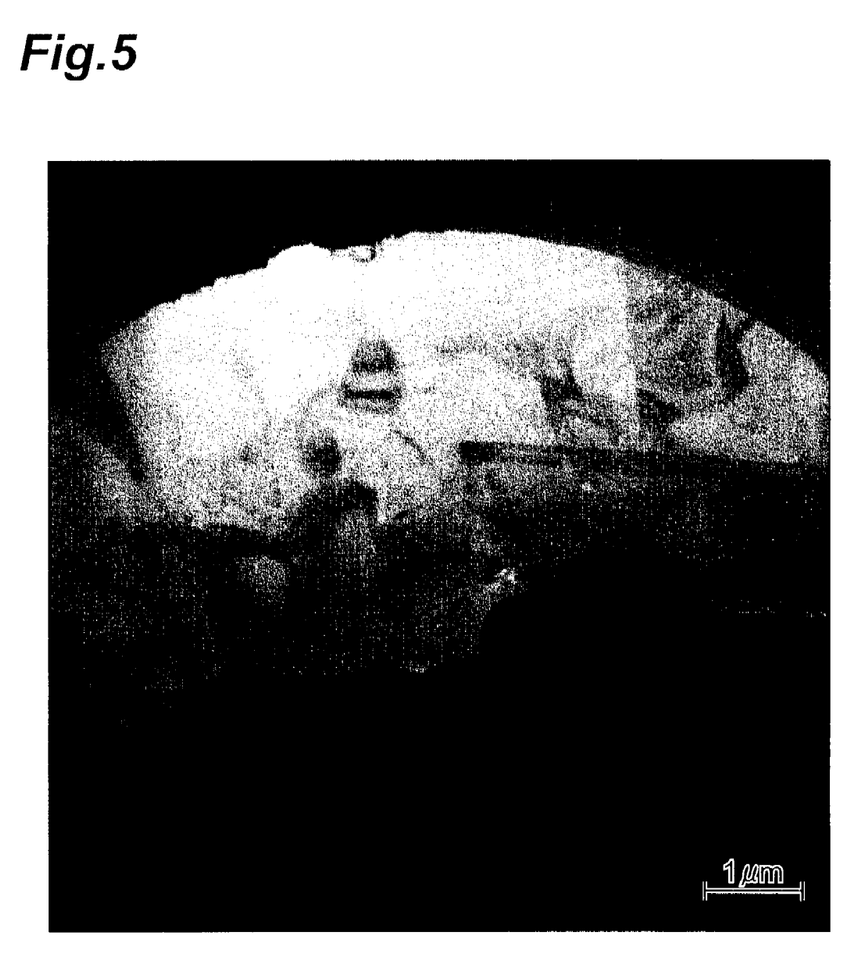
FIG. 5 is a view showing a transmission electron microscope (TEM) photograph of a cross-section of the zeolite layer of the zeolite separation membrane obtained in Example 1.

A cross-section of the zeolite layer of the obtained zeolite separation membrane was observed with a transmission electron microscope (TEM). FIG. 5 is a view showing a TEM photograph of a cross-section of the zeolite layer of the obtained zeolite separation membrane.

Example 2

A zeolite separation membrane was fabricated in the same manner as in Example 1, except that: the temperature of the reaction solution at the start of immersion was adjusted to 10° C.; after the start of immersion, the temperature of the reaction solution was first held at or below 32° C. for 60 minutes by circulation of 33° C. water for 60 minutes through the jacket; and the temperature of the reaction solution was held between 25° C. and 32° C. for 50 minutes during the period in which the temperature was kept at or below 32° C. The separation factor and permeation flux ($Kg/m^2$ h) of the obtained zeolite separation membrane were determined in the same manner as in Example 1. The results are shown in Table 1. The changes in temperature of the reaction solution during 80 minutes after the start of immersion are shown in FIG. 3.

COMPARATIVE EXAMPLE 1

A zeolite separation membrane was fabricated in the same manner as in Example 1, except that the temperature of the reaction solution was raised to 75° C. by circulation of 76° C. water through the jacket immediately after the start of immersion. The separation factor and permeation flux ($Kg/m^2$ h) of the obtained zeolite separation membrane were determined in the same manner as in Example 1. The results are shown in Table 1. The changes in temperature of the reaction solution during 80 minutes after the start of immersion are shown in FIG. 3.

Figure 6:
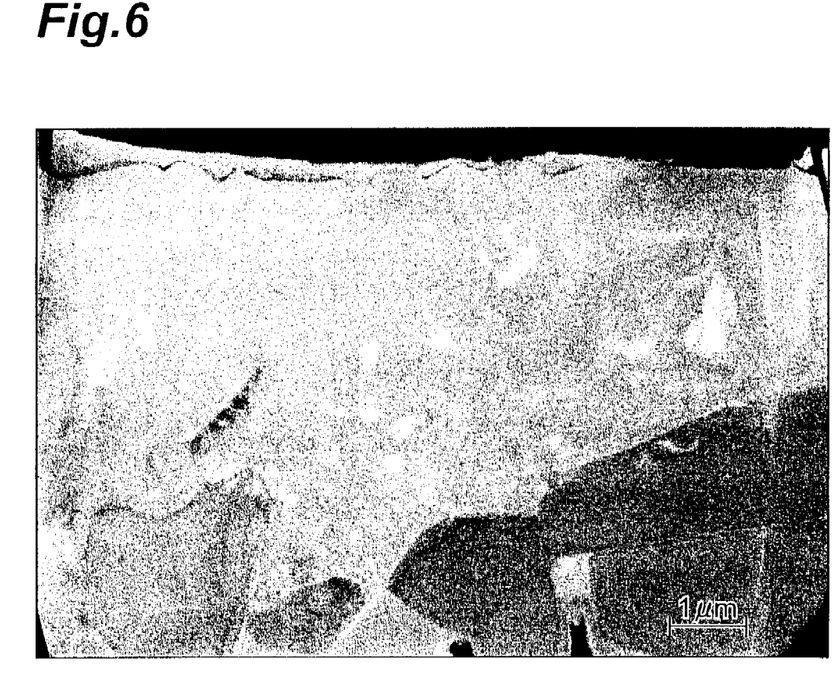
FIG. 6 is a view showing a transmission electron microscope (TEM) photograph of a cross-section of the zeolite layer of the zeolite separation membrane obtained in Comparative Example 1.

A cross-section of the zeolite layer of the obtained zeolite separation membrane was observed with a transmission electron microscope (TEM). FIG. 6 is a view showing a TEM photograph of a cross-section of the zeolite layer of the obtained zeolite separation membrane.

COMPARATIVE EXAMPLE 2

A zeolite separation membrane was fabricated in the same manner as in Example 1, except that: the temperature of the reaction solution at the start of immersion was adjusted to 18° C.; after the start of immersion, the temperature of the reaction solution was first held at or below 51° C. for 40 minutes by circulation of 52° C. water for 40 minutes through the jacket; and the temperature of the reaction solution was held between 35° C. and 51° C. for 30 minutes during the period in which the temperature was kept at or below 51° C. The separation factor and permeation flux (Kg/m² h) of the obtained zeolite separation membrane were determined in the same manner as in Example 1. The results are shown in Table 1. The changes in temperature of the reaction solution during 80 minutes after the start of immersion are shown in FIG. 3.

COMPARATIVE EXAMPLE 3

A zeolite separation membrane was fabricated in the same manner as in Example 1, except that: the temperature of the reaction solution at the start of immersion was adjusted to 10° C.; after the start of immersion, the temperature of the reaction solution was first held at or below 41° C. for 40 minutes by circulation of 42° C. water for 40 minutes through the jacket; and the temperature of the reaction solution was held between 30° C. and 41° C. for 30 minutes during the period in which the temperature was kept at or below 41° C. The separation factor and permeation flux (Kg/m² h) of the obtained zeolite separation membrane were determined in the same manner as in Example 1. The results are shown in Table 1. The changes in temperature of the reaction solution during 80 minutes after the start of immersion are shown in FIG. 3.

COMPARATIVE EXAMPLE 4

A zeolite separation membrane was fabricated in the same manner as in Example 1, except that: after the start of immersion, the temperature of the reaction solution was first held at or below 31° C. for 20 minutes by circulation of 32° C. water for 20 minutes through the jacket; and the temperature of the reaction solution was held between 25° C. and 31° C. for 10 minutes during the period in which the temperature was kept at or below 31° C. The separation factor and permeation flux (Kg/m² h) of the obtained zeolite separation membrane were determined in the same manner as in Example 1. The results are shown in Table 1. The changes in temperature of the reaction solution during 80 minutes after the start of immersion are shown in FIG. 3.

COMPARATIVE EXAMPLE 5

A zeolite separation membrane was fabricated in the same manner as in Comparative Example 1, except that the reaction solution was aged at 30° C. for 60 minutes before immersing the porous support in the reaction solution. The separation factor and permeation flux (Kg/m² h) of the obtained zeolite separation membrane were determined in the same manner as in Example 1. The results are shown in Table 1.

COMPARATIVE EXAMPLE 6

A zeolite separation membrane was fabricated in the same manner as in Comparative Example 1, except that the reaction solution was aged at 50° C. for 60 minutes before immersing the porous support in the reaction solution. The separation factor and permeation flux (Kg/m² h) of the obtained zeolite separation membrane were determined in the same manner as in Example 1. The results are shown in Table 1.

TABLE 1

|  | Separation factor | Permeation Flux (Kg/m²h) |
|---|---|---|
| Example 1 | 4435 | 0.890 |
| Example 2 | 5252 | 0.994 |
| Comp. Ex. 1 | 215 | 1.02 |
| Comp. Ex. 2 | 986 | 1.03 |
| Comp. Ex. 3 | 1300 | 1.09 |
| Comp. Ex. 4 | 855 | 1.34 |
| Comp. Ex. 5 | 11 | 2.43 |
| Comp. Ex. 6 | 1.82 | 3.04 |

As seen in Table 1, the zeolite separation membranes obtained in Examples 1 and 2 exhibited extremely superior separation factors. Furthermore, the permeation fluxes were sufficiently high for practical use, although they were inferior to those of the zeolite separation membranes obtained in Comparative Examples 5 and 6.

Also, as seen in FIGS. 5 and 6, the zeolite layer of the zeolite separation membrane obtained in Comparative Example 1 contained numerous microcrystals and grain boundaries, whereas the zeolite layer of the zeolite separation membrane obtained in Example 1 had very few microcrystals and grain boundaries.

Thus, Examples 1 and 2 and Comparative Examples 1 to 6 demonstrate that the zeolite separation membrane according to the invention possesses a homogeneous zeolite layer with very few microcrystals and grain boundaries, and that by using the zeolite separation membrane of the invention, it is possible to accomplish reliable and satisfactory separation of alcohol and water even when the water content relative to alcohol is low.

INDUSTRIAL APPLICABILITY

The zeolite separation membrane and production process therefor according to the invention can be utilized for separation of organic solvent, particularly alcohol, and water.

The invention claimed is:

1. A process for production of a zeolite separation membrane having a porous support and a zeolite layer formed on the porous support, the process comprising:

a seed crystal attaching step in which zeolite seed crystals are attached to the porous support;

a layer forming step in which: the porous support to which the zeolite seed crystals have been attached is contacted with a reaction solution containing zeolite raw material, and the temperature of the reaction solution is raised to a prescribed temperature to form the zeolite layer on the porous support; and a support separating step in which the porous support on which the zeolite layer has been formed is separated from the reaction solution;

wherein in the layer forming step, after the start of contact between the porous support and reaction solution, the temperature of the reaction solution is held at or below 40° C. for a duration of between 30 minutes and 60 minutes before being raised to the prescribed temperature.

2. The process for production of a zeolite separation membrane according to claim 1, wherein in the layer forming step, the temperature of the reaction solution is in the range between 0° C. and 30° C. at the start of contact between the porous support and reaction solution.

3. The process for production of a zeolite separation membrane according to claim 1, wherein in the layer forming step, the temperature of the reaction solution is held at the prescribed temperature for at least 2 hours after being raised to the prescribed temperature.

4. The process for production of a zeolite separation membrane according to claim 2, wherein in the layer forming step, the temperature of the reaction solution is held at the prescribed temperature for at least 2 hours after being raised to the prescribed temperature.

5. A zeolite separation membrane obtained by the process for production of a zeolite separation membrane according to claim 1.

* * * * *